United States Patent [19]

Iwaki et al.

[11] Patent Number: 5,531,322

[45] Date of Patent: *Jul. 2, 1996

[54] STORAGE CASE

[75] Inventors: Yuji Iwaki; Shuichi Kikuchi, both of Miyagi; Hiroshi Asakura, Saitama, all of Japan

[73] Assignee: Sony Corporation, Tokyo, Japan

[ * ] Notice: The term of this patent shall not extend beyond the expiration date of Pat. No. 5,293,995.

[21] Appl. No.: 158,469

[22] Filed: Nov. 29, 1993

[30] Foreign Application Priority Data

| Nov. 30, 1992 | [JP] | Japan | 4-320042 |
| Nov. 30, 1992 | [JP] | Japan | 4-320043 |
| Nov. 30, 1992 | [JP] | Japan | 4-320044 |
| Dec. 25, 1992 | [JP] | Japan | 4-345780 |
| Apr. 23, 1993 | [JP] | Japan | 5-097662 |

[51] Int. Cl.$^6$ ............................................. B65D 85/30
[52] U.S. Cl. ........................ 206/308.3; 206/472; 206/307
[58] Field of Search .......................... 206/308.3, 308.1, 206/307, 309, 310, 311, 312, 313, 303, 472, 473, 474, 475, 387.13, 387.1; 220/326, 337, 338, 306, 324

[56] References Cited

U.S. PATENT DOCUMENTS

| 2,205,969 | 6/1940 | Boenecke | 220/338 X |
| 3,425,587 | 2/1969 | Duross | 220/4.22 X |
| 4,314,637 | 2/1982 | Posso | 220/306 X |
| 4,627,534 | 12/1986 | Komiyama et al. | 206/309 X |
| 4,746,013 | 5/1988 | Suzuki et al. | 206/309 |
| 4,971,220 | 10/1990 | Kaufman et al. | 220/335 |
| 5,127,537 | 7/1992 | Graham | 206/339 |
| 5,209,593 | 5/1993 | Ros | 206/472 X |
| 5,293,995 | 3/1994 | Iwaki et al. | 206/308.3 |

FOREIGN PATENT DOCUMENTS

| 2266707 | 11/1983 | United Kingdom . |
| 2210026 | 6/1989 | United Kingdom . |

Primary Examiner—Paul T. Sewell
Assistant Examiner—Tara L. Laster
Attorney, Agent, or Firm—Ronald P. Kananen

[57] ABSTRACT

A storage case for flat, uniformly shaped quadrilateral objects such as floppy disks includes a rectangular box like lid and base portions hinged to both sides of a central spine portion. Inside each of the base and lid portions two pair of ribs are provided for firmly gripping a floppy disk, or the like, inserted therein. The ribs may include a pressure applying first rib opposed to a top gripping second rib for added security. A central spine of the case includes additional ribs for grippingly engaging a third floppy disk which may thus be held separately from the disks inserted in the base and lid such that three disks may be securely held without rattling. The edges of the case are provided with three closing members corresponding to three engaging members to assure secure closure and, in addition, mating edges of the side wall portions may be formed at compatible angles which interlock in a closed condition of the case preventing plastic deformation thereof when the case is carried. Further, the base and/or lid may be hinged at a central portion thereof for allowing partial opening of the case while the main part thereof remains closed.

18 Claims, 15 Drawing Sheets

STORAGE CASE

BACKGROUND OF THE INVENTION

Field of the Invention

The present invention relates generally to a storage case for flat objects. Particularly the present invention relates to a storage case for floppy disks or the like which assures reliable, secure locking and easy opening, while also being convenient and simple in construction.

Description of the Prior Art

A conventional storage case for a plurality of plate objects, such as floppy disks or the like, is shown in FIG. 23. As may be seen, the case 101 comprises a case body 102 also serving as a bottom lid, a back plate, or spine 104, provided at one side of the case body 102 through a thin-wall type hinge 103, and a lid 106 serving as a top lid is adjacently provided at the other side of the back plate 104 through a second thin wall hinge 105.

A closing member (locking member) for keeping the case body 102 in a closed state is provided on the case body 102 and a closing member engaging portion 108 is provided on the lid 106.

The closing member 107 is provided at the central portion of a side wall 109 at the opening/closing side, or front side of the case body 102, arranged approximately parallel to the side wall 109. A closing member engaging portion is formed at a central portion of a side wall 110 so as to oppose the closing member in a closed condition of the case 101.

When the lid member 106 is closed against the case body 102 the closing member 107 engages the engaging member 108 to maintain a closed condition of the case 101.

In the interior of the case 101, ribs 111, 112 are formed projecting from inner sides of the case body 102 and the lid 106. These ribs are 'pinching' members for retaining floppy disks. As may be seen the ribs 111 are formed at portions of the case body 102 and lid 106 adjacent the hinges 103 and 105, while the ribs 112 are formed adjacent the front side of the side walls 109 and 110.

However, floppy disk cases with a construction as outlined above have the following drawbacks. First, since the case is retained in a closed condition by a single fastening member on a side wall opposing the back wall 104, secure closure is not always reliably assured. Further, movement of the lid 106 relative the case body 102 due to flexure of the hinges 103, 105, while the case is being carried, for example, disengagement of the closing member 107 with the engaging portion 108 may be effected.

Thus, it has been required to provide a storage case for floppy disks and the like which assures secure closing under all conditions of use.

Summary of the Invention

It is therefore a principal object of the present invention to overcome the drawbacks of the prior art.

It is a further object of the present invention to provide a storage case for floppy disks which assures secure closure with simple and economical construction.

In order to accomplish the aforementioned and other objects, a storage case for flat, uniformly shaped quadrilateral objects is provided, comprising: a substantially rectangular spine; a quadrilateral base attached to the spine at a first longitudinal side thereof via a first hinge, the base including a front wall projected in a first vertical direction therefrom at a second side thereof remote from the hinge and side walls projected at the first vertical direction therefrom at third and fourth sides thereof which are substantially perpendicular to the first and second sides; a quadrilateral lid attached to the spine at a second longitudinal side thereof via a second hinge, the lid including a front wall projected in a first vertical direction therefrom at a second side thereof remote from the hinge and side walls projected at the first vertical direction therefrom at third and fourth sides thereof which are substantially perpendicular to the first and second sides, the base and the lid being pivotable relative the spine on the first and second hinges to form a substantially enclosed box; a first closing member provided in a central portion of the front wall of one of the base or the lid the first closing member comprising a vertically projecting wall portion having a lip projected along an upper side thereof in a direction facing away from the spine; a first engaging portion engageable with the first closing member provided in a central portion of the other of the base or the lid the first engaging portion comprising a projecting portion formed on an inner side of the front wall engageable under the lip of the first closing member; second and third closing members provided respectively on each of the side walls of one of the base and the lid; second and third engaging portions engageable with the second and third closing members and respectively provided at a corresponding position along a side wall of the other of the base or the lid; and two pair of opposed ribs provided on an inner surface of each of the base and the lid, a distance between each pair of opposed ribs being determined so as to snugly receive one of the flat uniformly shaped quadrilateral objects for applying pinching pressure thereto.

DESCRIPTION OF THE PREFERRED EMBODIMENT

Figure 1:
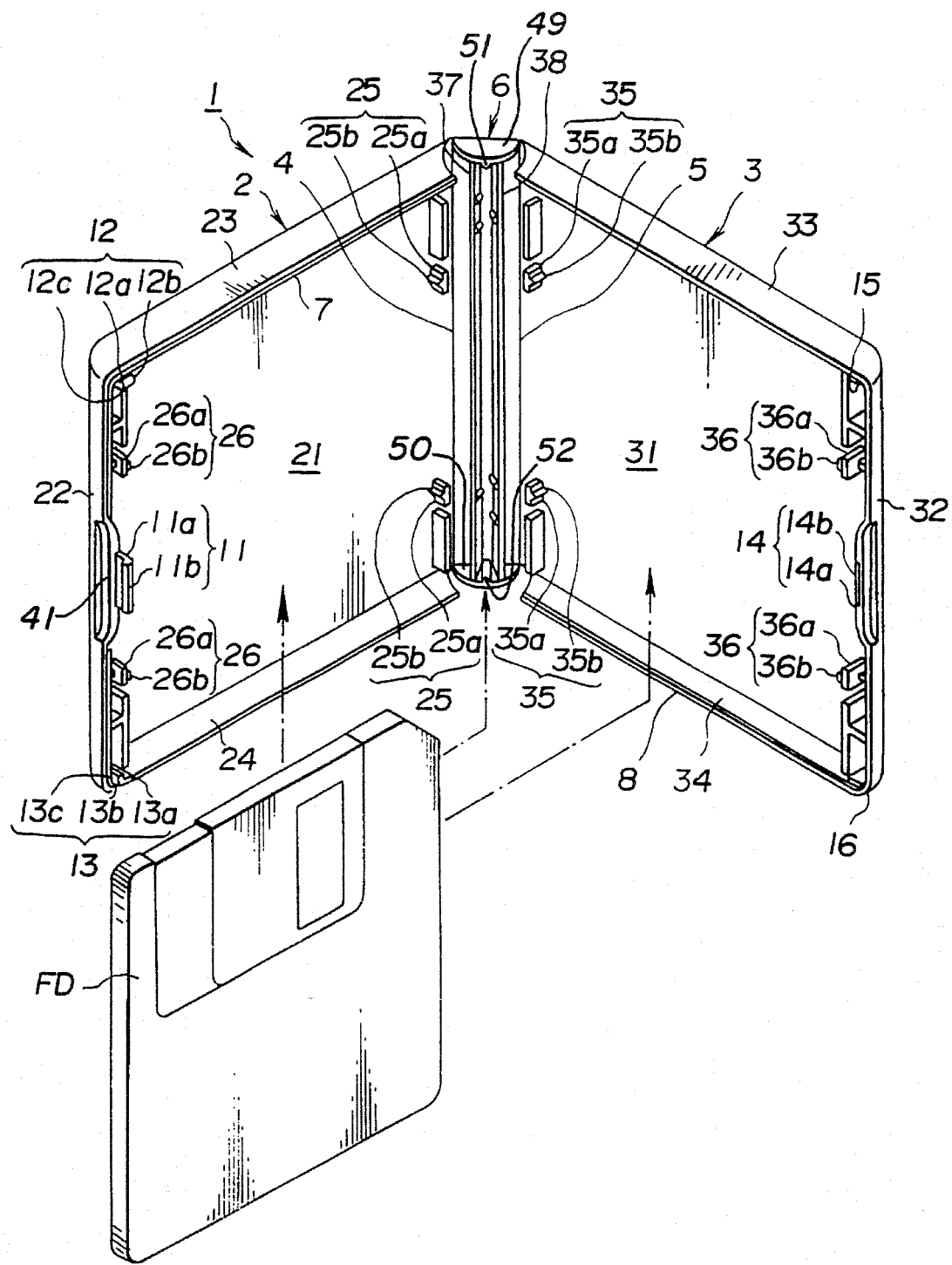
FIG. 1 is a perspective view of a storage case for floppy disks according to a first preferred embodiment of the invention.

Referring now to the drawings, particularly to FIG. 1, a storage case (hereinbelow: case) 1 according to a first embodiment of the invention will be described in detail.

According to the present embodiment, the storage case 1 comprises a base 2 (case body) including a bottom plate 21 at the inner surface thereof and a lid 3 including a top plate 31 at the inner surface thereof, which are attached at opposite sides of a spine 6 via hinges 4 and 5 respectively. According to this, the lid 3 and base 2 can be moved relative to the spine 6 so as to open and close the storage case 1.

First to third locking members 11, 12 and 13 are provided on either one of the base 2 or the lid 3, while first to third engaging portions 14, 15 and 16 are provided on the opposing side for engaging with the locking members for effecting closure of the case 1. It will be noted that according to the present embodiment, the locking members are provided on the base 2 and the engaging members on the lid 3.

Vertically projected from edges of the bottom plate 21 of the base 2 are a front wall portion 22 at a side opposite that attached to the hinge 4 and first and second side wall portions 23, 24 respectively projected from opposing sides perpendicular to the hinge 4. Vertically projected from edges of the top plate 31 of the lid 3 are a front wall portion 32 at a side opposite that attached to the hinge 5 and first and second side wall portions 33, 34 respectively projected from opposing sides perpendicular to the hinge 5. Thus a rectangular enclosure is provided for holding floppy disks, or the like, between the wall portions 22–24, 32–34.

When a floppy disk FD is set into the lid, for example, it is retained between two pair of ribs 35, 36 and 35, 36 vertically projected from the top plate 31 to be held thereagainst. Similarly, when a floppy disk FD is set into the base 2, it is retained between two pair of ribs 25, 26 and 25, 26 to be held against the bottom plate 21. Thus floppy disks, or other flat objects to be stored in the storage case 1 can be suitably retained in an open or closed condition of the storage case 1.

The spine 6 has a pair of holding bars 37, 38 longitudinally projected from the inner surface thereof for retaining a third floppy disk FD. Semicircular end members 49, 50 are vertically projected from top and bottom sides of the spine 6 so as to act as part of the side walls of the storage case 1 when the storage case 1 is in a closed condition. Also, formed on center portions of facing surfaces of the end members 49, 50, are pinching or squeezing ribs 51, 52 having a predetermined distance therebetween. The pinching ribs are active to apply squeezing pressure to the top and bottom of a floppy disk FD set therebetween. The pinching ribs 51, 52 are further described below with reference to FIG. 12.

When floppy disks FD are set into the storage case 1 to be held between the base 2, the lid 3, and the spine 6, the edges of the side walls 22 and 23 of the base 2 overlap those of the side walls 32 and 33 of the lid and also the first to third closing members 11–13 engage with the engaging portions 14–16 so as to keep the storage case 1 sealingly closed.

Figure 3:
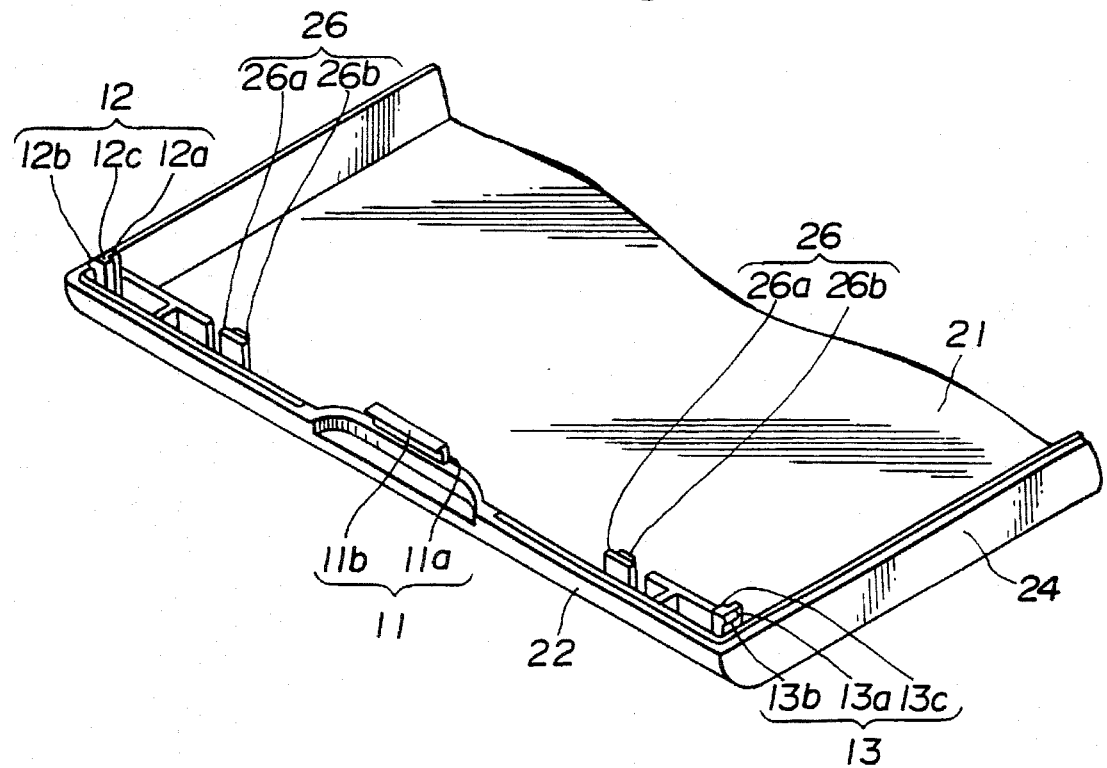
FIG. 3 is an enlarged perspective view of a first closing member according to the embodiment.

As seen in FIGS. 1 and 3, the first closing member 11 comprises a protruding tongue 11a having a predetermined width and provided at a central portion of the edge of the front wall 22 and also includes an engaging protrusion 11b at the tip of the tongue 11a.

As best seen in FIG. 1, the engaging member 14 provided on the lid 3 for engaging with the first closing member 11 comprises a notch 14a having a width slightly larger than the tongue 11a and is provided at a central portion of the edge of the front wall 32 of the lid. The first engaging member 14 further includes a protrusion 14b on the inner surface of the notch 14a.

Figure 4:
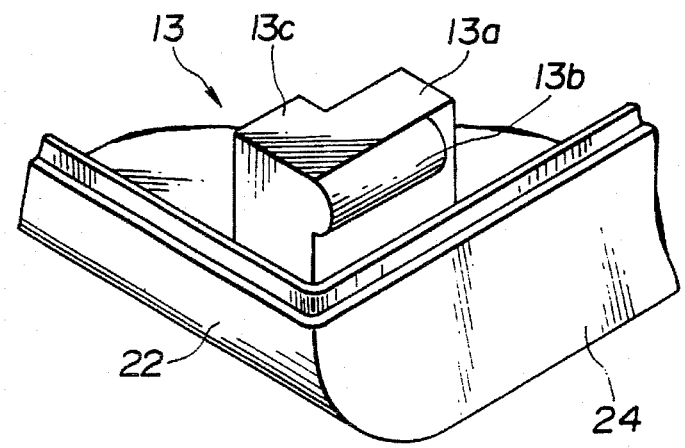
FIG. 4 is a enlarged perspective view of second and/or third closing member of the first embodiment.

Referring to FIGS. 1, 3 and 4, the second and third closing members 12 and 13 are set into corner portions of the base 2 where the front wall 22 meets the side walls 23 and 24 respectively and comprise protruding tongues 12a and 13a, outwardly facing engaging protrusions 12b and 13b provided on the protruding tongues 12a and 13a and reinforcing ribs 12c and 13c which are aligned approximately parallel with the hinges 4 and 5 and are provided at one side of the tongues 12a and 13a respectively, along the front wall 22.

Figure 2:
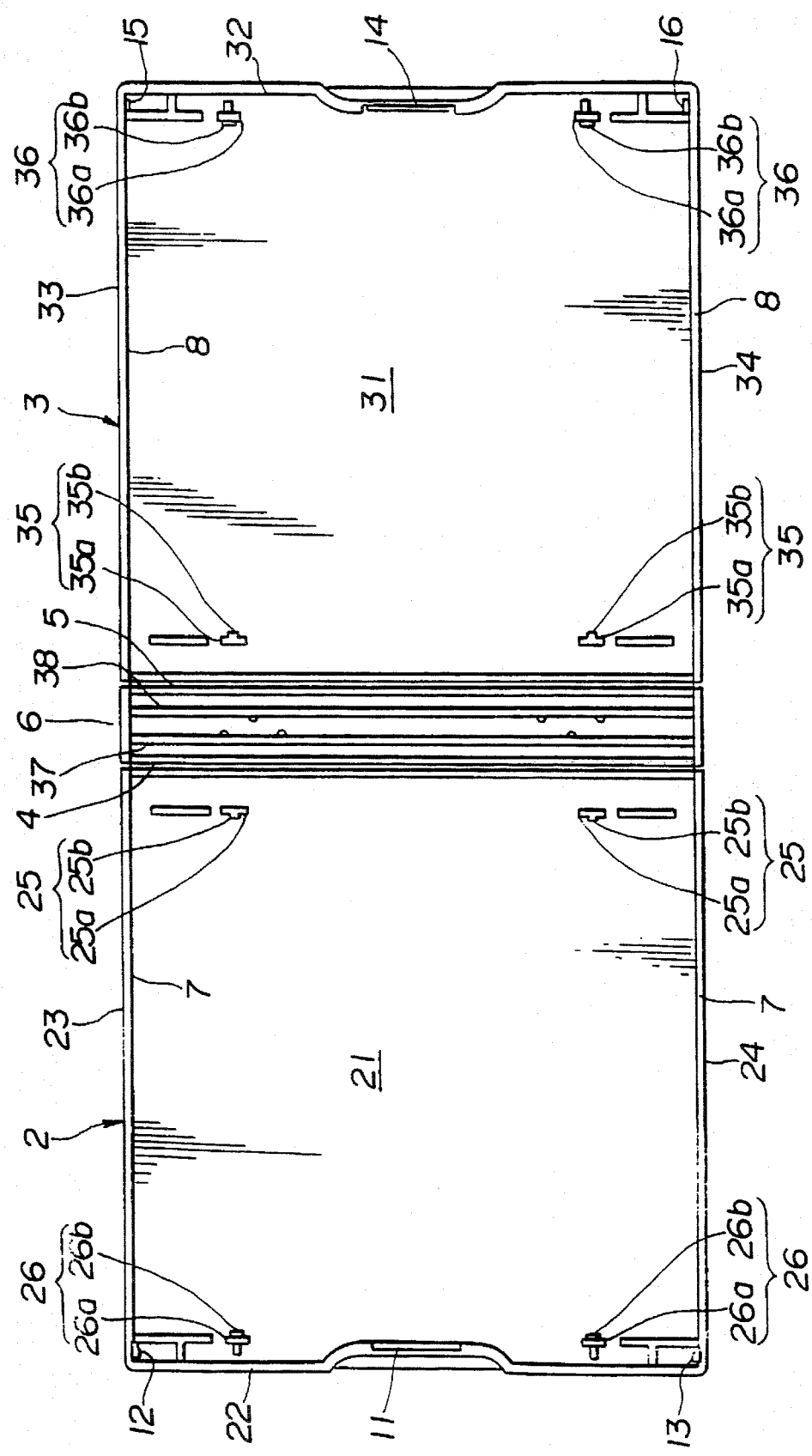
FIG. 2 is a plan view of the floppy disk storage case of FIG. 1.
Figure 5:
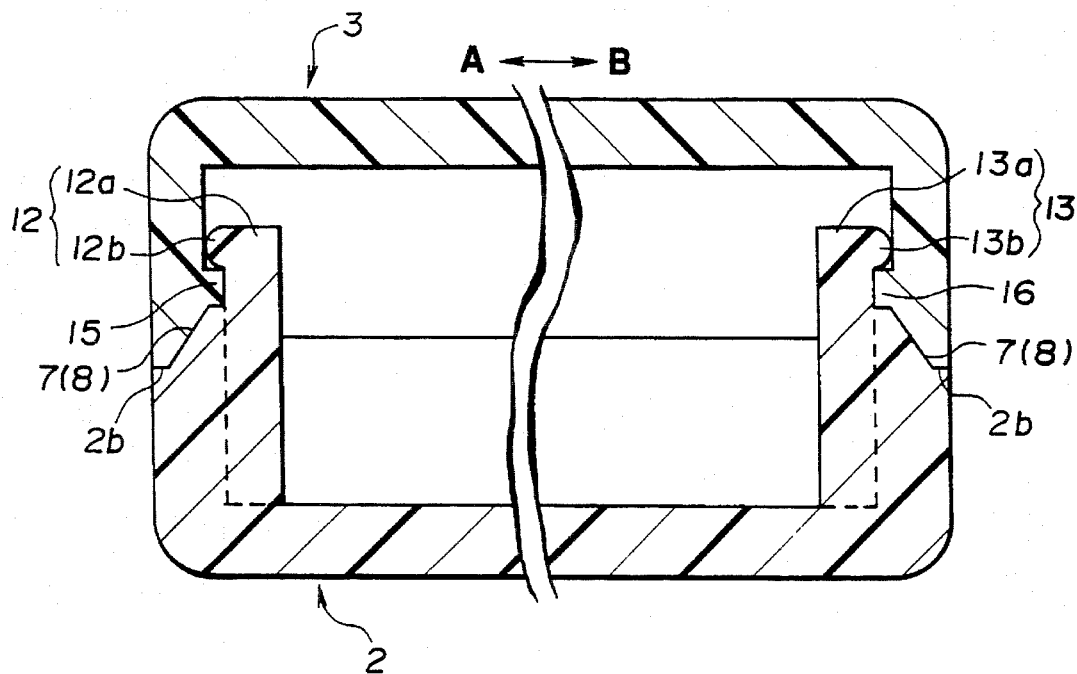
FIG. 5 is a cross-sectional view of the storage case of the first embodiment in a closed condition.

FIGS. 1, 2 and 5 show the second and third engaging members 15, 16 which engage with the second and third closing members 12 and 13. These engaging members are provided in corner portions of the lid 3 and are formed as protrusions for interlocking with the tongues 12b and 13b of the second and third closing members 12 and 13. Engagement between the second and third closing and engaging members is best seen in FIG. 5. According to this structure fluctuation or sliding of the lid 3 relative the base 2 in the direction A–B of FIG. 5 is prevented. Thus, the storage case 1 according to the invention will remain securely closed even when being carried, or otherwise subjected to external stress.

Further, provision of the reinforcing ribs 12c and 13c of the closing members 12 and 13 prevent sliding of the tongues 12a and 13a relative the engaging members 15 and 16 and the closed condition of the storage case 1 is thus reliably maintained.

Thus, according to the invention, when two floppy disks, or other uniformly shaped flat objects are stored in a storage case 1 as set forth above, the floppy disks FD are securely held in position by the opposed pairs of ribs 25, 26, 25, 26 and 35, 36, 35, 36 and a third floppy disk can additionally be held in place between the holding bars 37, 38 longitudinally projected from the inner surface of the spine 6, for assuring correct positioning of the floppy disks FD when the storage case 1 is closed.

Further, according to the above-described embodiment, the storage case 1 may be preferably formed of polyethylene or polystyrene.

According to the invention, a maintaining of the floppy disks inserted in the lid 3 and/or the base 2 may be further enhanced by modifying the structure of the pairs of ribs 25, 25, 26, 26 and 35, 35, 36, 36 as will be described in detail hereinbelow with reference to FIGS. 1 and 6–9.

Figure 6:
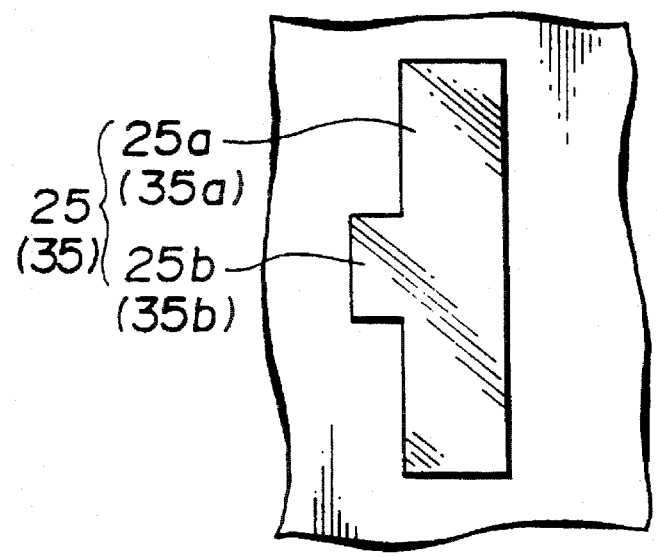
FIG. 6 is a plan view of a first rib according to the first embodiment.
Figure 7:
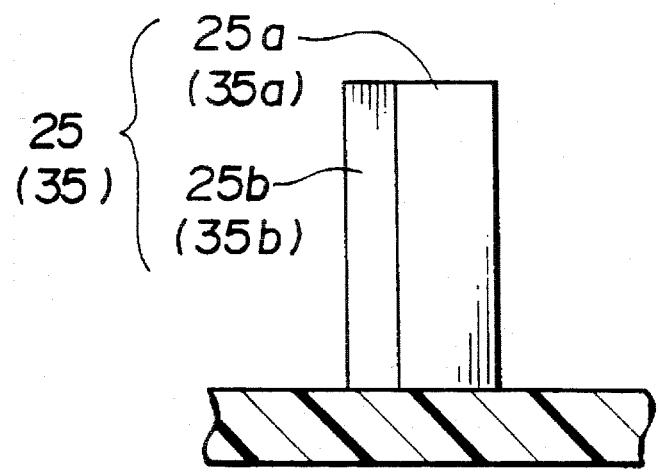
FIG. 7 is a side view of the first rib of FIG. 6.
Figure 8:
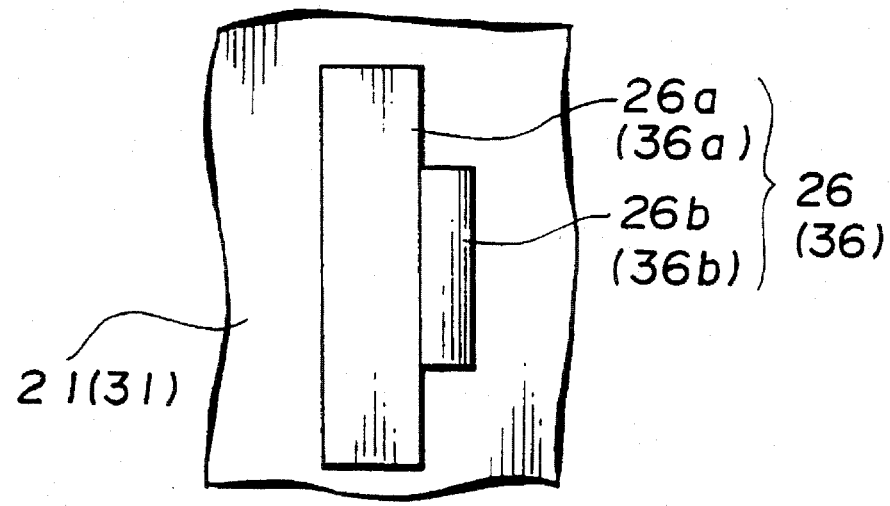
FIG. 8 is a plan view of a second rib opposed to the first rib of FIG. 6.
Figure 9:
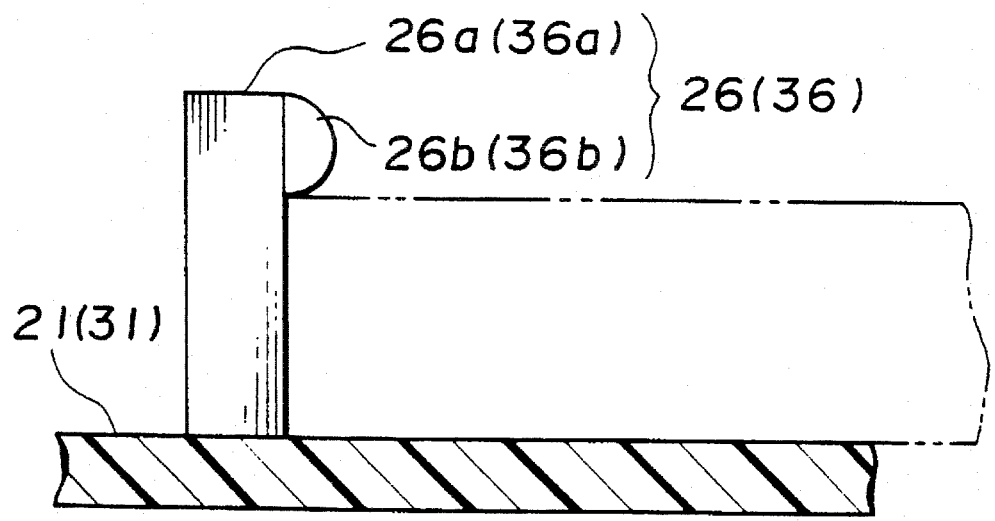
FIG. 9 is a side view of the second rib of FIG. 8.

Referring to FIGS. 6 and 7, plan and side view of a rib 25 is shown, it will be understood that the other rib 25 and the ribs 35, 35 are of an identical configuration. As may be seen in the drawing, the rib 25 comprises a wall portion 25a provided in the vicinity of the hinge 4 and arranged substantially parallel thereto. A protrusion 25b is provided on one side of the wall portion 25a facing the interior space (and the rib 26) of the base 2 for applying pinching force for retaining a floppy disk FD inserted into the base 2 of the storage case 1. The ribs 26, 26, 36, 36, which are arranged to respectively oppose the ribs 25, 25, 35, 35 are configured as shown in FIGS. 8 and 9. That is, the rib 26, for example, comprises a wall portion 26a, substantially parallel to the front wall 22, and having a projecting lip 26b projecting from an upper side thereof in the direction of the opposing rib 25. As seen in FIG. 9 the projecting lip 26b is formed high enough that the width of a floppy disk FD fits snugly thereunder when inserted into the base 2, while the protrusion 25b of the rib 25 acts to push the other side of the floppy disk FD for positionally maintaining the inserted condition of the floppy disk FD. Thus, the two pair of ribs 25, 26, 25, 26 act to retain all four corners of a floppy disk FD when inserted in the base 2 and, in the identical way, the two pair of ribs 35, 36, 35, 36 act to retain all four corners of a floppy disk FD inserted in the lid 3.

According to the above modification, the following advantages may be provided:

(1) Because the top (the side not contacting the top or bottom plate 21 or 31) of the stored object is pressed by the projecting lip 26b (36b) of the ribs 26 (36), the stored object will not drop from the storage case 1 during opening or closing thereof.

(2) Because the top (the side not contacting the top or bottom plate 21 or 31) of the stored object is pressed by the projecting lip 26b (36b) of the ribs 26 (36), the stored object will not clatter, or rattle during carrying of the storage case 1 even if one or two stored objects are contained in the storage case 1.

In addition, the security of closure of the storage case 1 may be enhanced according to a modification of the front and side walls 22–24 and 32–34 of the base 2 and the lid 3 as described hereinbelow with reference to FIGS. 1 and 5.

According to this, a central area 7 of a top of the side walls 23, 24, for example is angled upward at a predetermined angle as seen in FIG. 5. Conversely, a central area 8 of side walls 33, 34 of the lid is angled downward at a predetermined angle corresponding to the angle of the central area 7 such that the central areas 7 and 8 mate flushly in a closed condition of the storage case 1, as seen in FIG. 5. According to this, relative motion between the base 2 and the lid 3 is further prevented and engagement between first to third closing members 11–13 with first to third engaging members 14 16 is supported and enhanced to provide even better closing characteristics for the storage case 1. Further, the central areas 7 and 8 of the side walls 23, 24, 33, 34 may be extended around the corners thereof to side portions of the front walls 22, 32, as seen, in FIG. 1.

Hereinbelow, a second embodiment of a storage case 1 according to the invention will be described in detail with reference to FIGS. 10–17 wherein like numerals will be used to describe like components for simplifying the description of the invention.

Similarly to the previous embodiment, the storage case 1 of the present embodiment comprises a base 2 (case body) including a bottom plate 21 at the inner surface thereof and a lid 3 including a top plate 31 at the inner surface thereof, which are attached at opposite sides of a spine 6 via hinges 4 and 5 respectively. According to this, the lid 3 and base 2 can be moved relative to the spine 6 so as to open and close the storage case 1.

However, according to the second embodiment, the spine is provided at one side thereof with a pair of first positioning ribs 47, 47 and at an other side thereof with a pair of second positioning ribs 48, 48.

Figure 12:
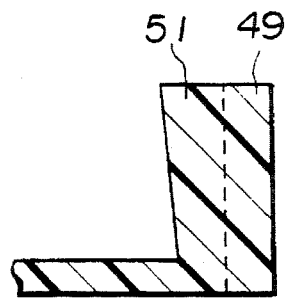
FIG. 12 is a side view of a projecting portion provided on upper and lower sides of the spine, projected vertically therefrom taken along line A—A of FIG. 11.
Figure 16:
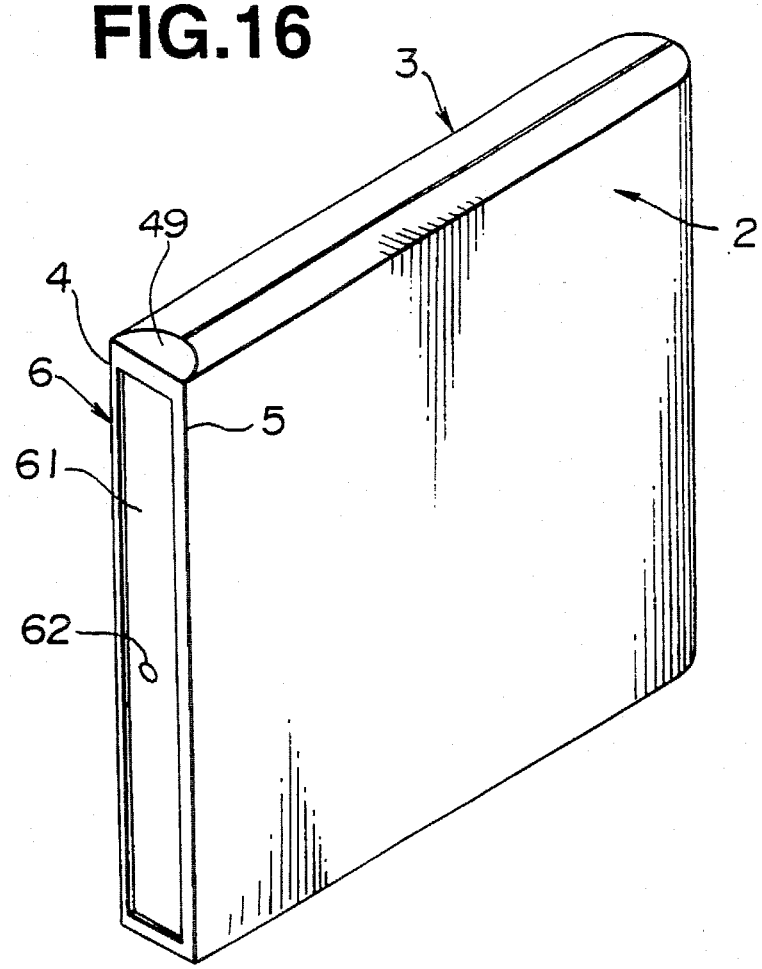
FIG. 16 is a perspective view of the storage case of the second embodiment in a closed condition.

In addition, semicircular end members 49. 50 are vertically projected from top and bottom sides of the spine 6 so as to act as part of the side walls of the storage case 1 when the storage case 1 is in a closed condition, as seen in FIG. 16. Also, formed on center portions of facing surfaces of the end members 49, 50, are pinching ribs 51, 52 having a predetermined distance therebetween. Referring to FIG. 12, it may be seen that the pinching ribs 51, 52 have an inverse tapered front face, that is an upper side thereof projects further than a base side thereof, thus the pinching ribs are active to apply squeezing pressure to the top and bottom of a floppy disk FD set therebetween. According to the present embodiment, the pinching ribs 51, 52 are semicircular, although other shapes may also be preferably employed.

Figure 10:
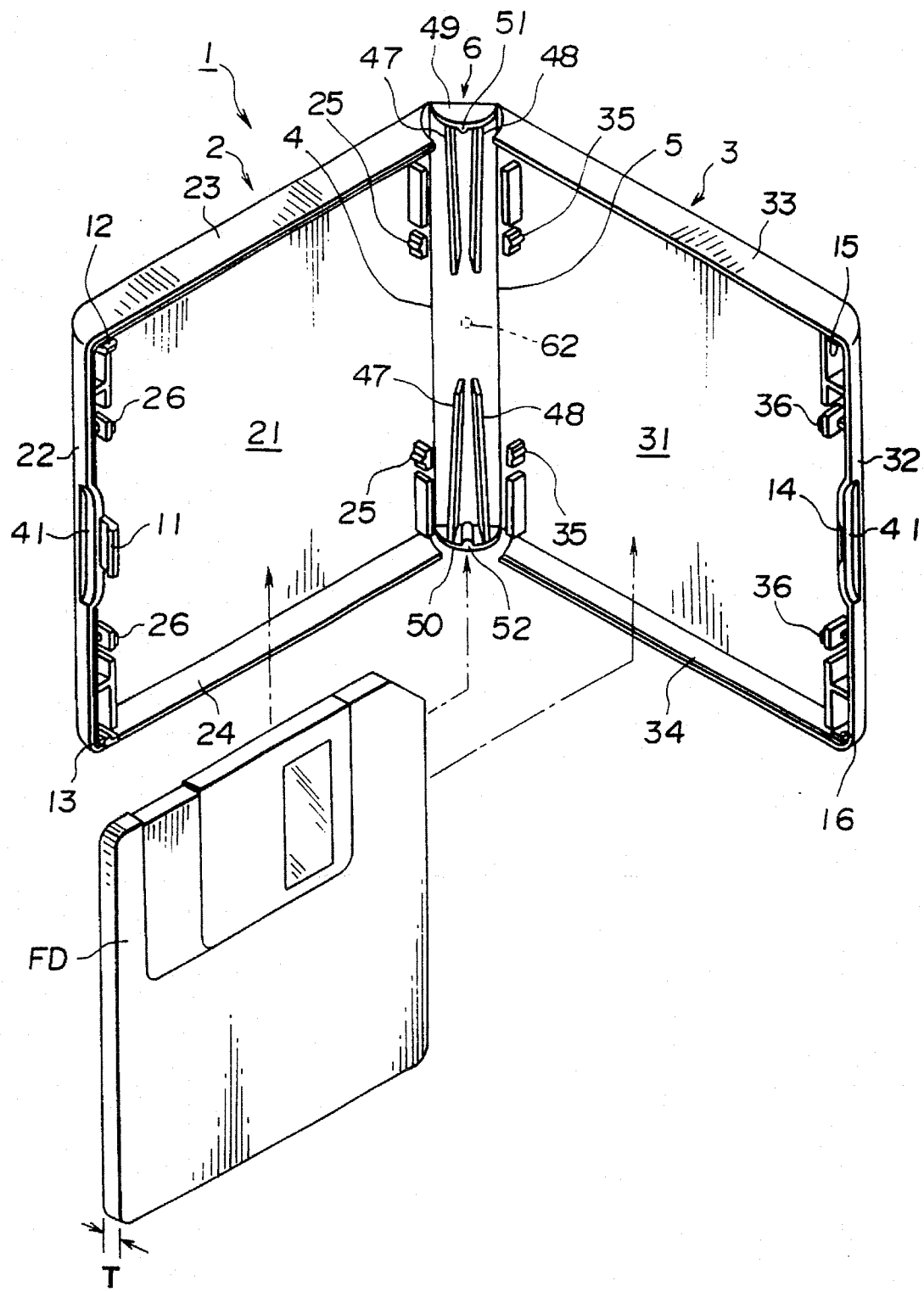
FIG. 10 is a perspective view of a storage case for floppy disks according to a second preferred embodiment of the invention.
Figure 11:
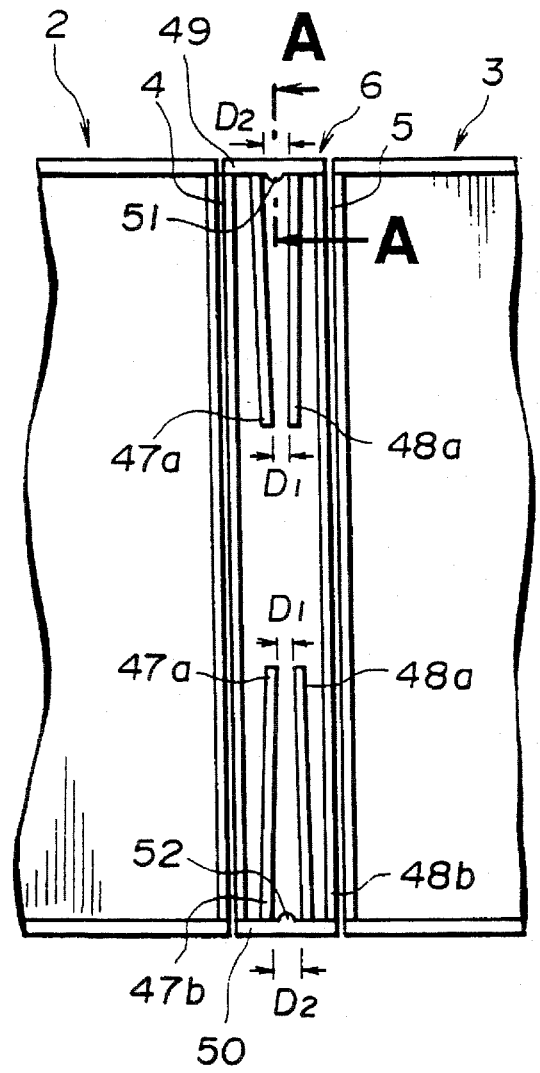
FIG. 11 is a plan view of a spine portion of a storage case according to the second embodiment showing positioning ribs provided thereon.

The above construction works in conjunction with the positioning ribs 47, 47, 48, 48, which are arranged so as to be inclined toward each other on upper and lower sides of the spine 6, as shown in FIG. 10 and 11, such that a width D1 is established between the proximate ends 47a, 48a of adjacent ribs 47, 48 which is smaller than a width D2 between the opposite ends 47b, 48b of the ribs which contact the end members 49, 50. This width D1 is predetermined as a width slightly smaller than a thickness T (see FIG. 10) of a floppy disk FD for applying squeezing pressure to sides of a floppy disk FD when inserted therebetween.

Thus, a storage case 1 according to the present embodiment is also effective for storing three floppy disks FD therein, two being set into the top and bottom plates as set forth in connection with the first embodiment, and a third being set into the spine according to the above disclosed structure of the positioning ribs 47, 48, 47, 48, the end members 49, 50 and the pinching ribs 51, 52, so that the three floppy disks FD are discretely held without rattling, or shaking loose when the storage case 1 is moved.

As in the above described first embodiment, the storage case 1 of the present embodiment is provided with first to third closing members 11–13 engageable with first to third engaging portions 14–16 for assuring secure closing of the storage case 1.

Figure 13:
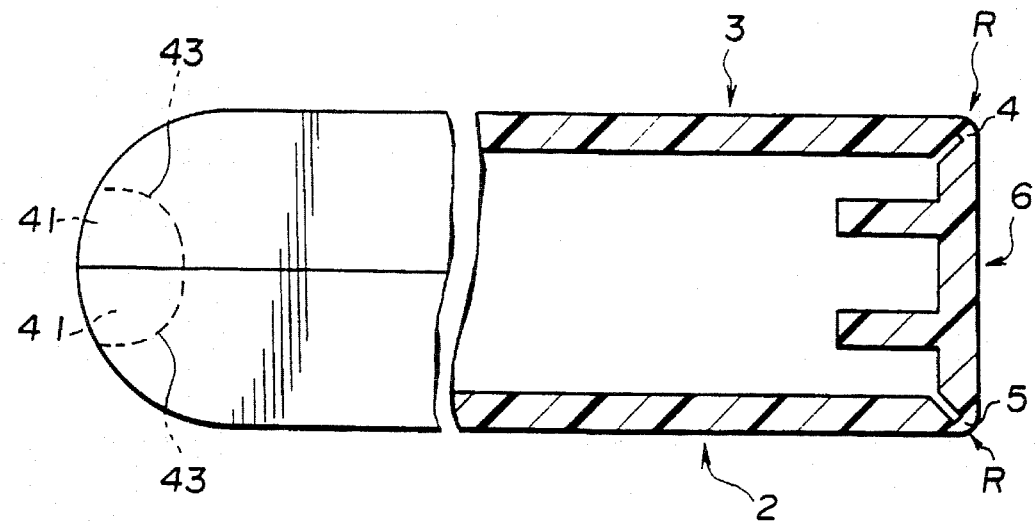
FIG. 13 is a partially cut-away side view of a storage case according to the second embodiment in a closed condition thereof.

It will further be noted in connection with both the first and second embodiments that the hinges 4 and 5 are constructed such that a width I of a thin wall portion thereof is in relation to a radius R of the hinge closure so as to form a rounded outer aspect when the storage case 1 is closed, and also to assure that, when the hinge assumes a closed condition, the top and/or bottom plates are oriented perpendicularly to the spine so as to maintain a desired rigidity of the case so that the various members of the storage case will maintain their engagement with each other and with the floppy disks FD. Such a condition of the hinges 4 and 5 is shown in FIGS. 13 and 14.

The correct width I of the thin wall portion of the hinges 4 and 5 (in both the first and second embodiments) for establishing the radius R may be determined according to the expression: $I=2R\pi/4$.

Therefore, if it is desired to set the radius R to, for example, 3 mm, I is obtained as $2\times0.3\times3.14/4=0.471$, therefore the thin wall width of the hinges 4 and 5 may be set to 0.471 mm.

Figure 14:
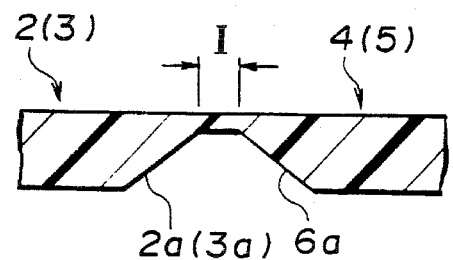
FIG. 14 is a cross-sectional view of a hinge according to the invention.

Moreover, the sides 2a (3a) of the base 2 or lid 3 facing the sides 6a of either side of the spine are angled correctly for allowing a perpendicular orientation of the hinge when closed, as seen in FIG. 14.

Figure 15:
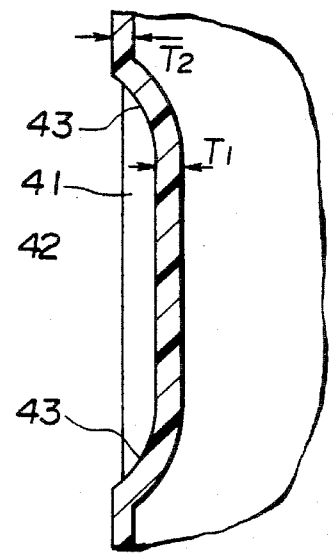
FIG. 15 is a plan view of a first closing member according to the second embodiment.

Referring to FIG. 15, an enlarged cross sectional view of finger applying recess 41 of the first closing member 11 and/or the first engaging member 14 is shown. It should be noted that the finger applying recess is provided in both the first and second embodiments. As seen in the drawing, the finger applying recess 41 includes rounded corner portions 43 to prevent deformation of a synthetic resin case material during molding, and to prevent build-up of dust near the closing members. The wall thickness T1 of the finger applying recess is made larger than a thickness T2 of the front wall 22 (and/or 32) of the storage case 1 in order to prevent plastic deformation of the base 2 or the lid 3 according to finger pressure during opening and/or closing of the storage case 1, which may cause loosening of the floppy disks FD stored therein.

Also, according to the second embodiment, as seen in FIG. 16, an outer side of the spine 6 is provided with a recessed central portion 61 for facilitating attachment of a label. This allows the label to be protected within the recess for enhancing longevity thereof, and also allows the label to be conveniently attached over a gate mark 62 in the spine which is formed during injection molding of the storage case 1 thus improving an overall appearance of the storage case 1. It will be noted that, alternatively to the recessed portion 62, a satin finished portion or the like may be provided for facilitating attachment of the label while reducing a complexity of a mold necessary for manufacture thereof.

Figure 17:
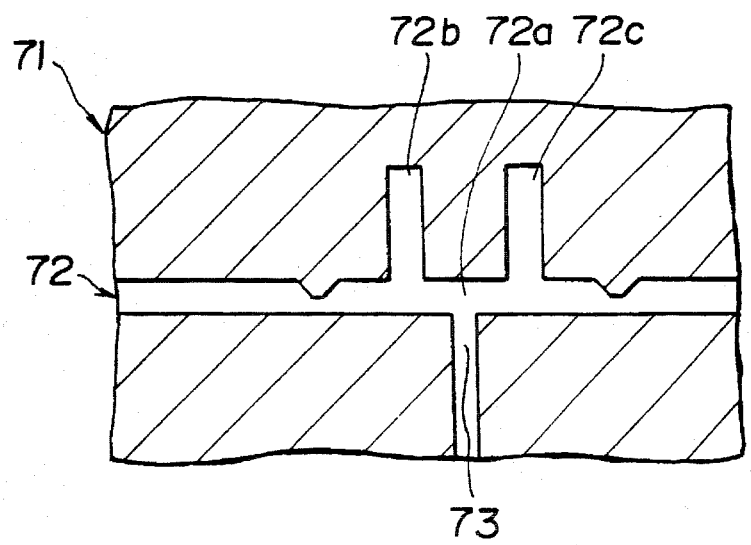
FIG. 17 is a cross-sectional view of engaged portions of the storage case of the second embodiment when in a closed state.
Figure 18:
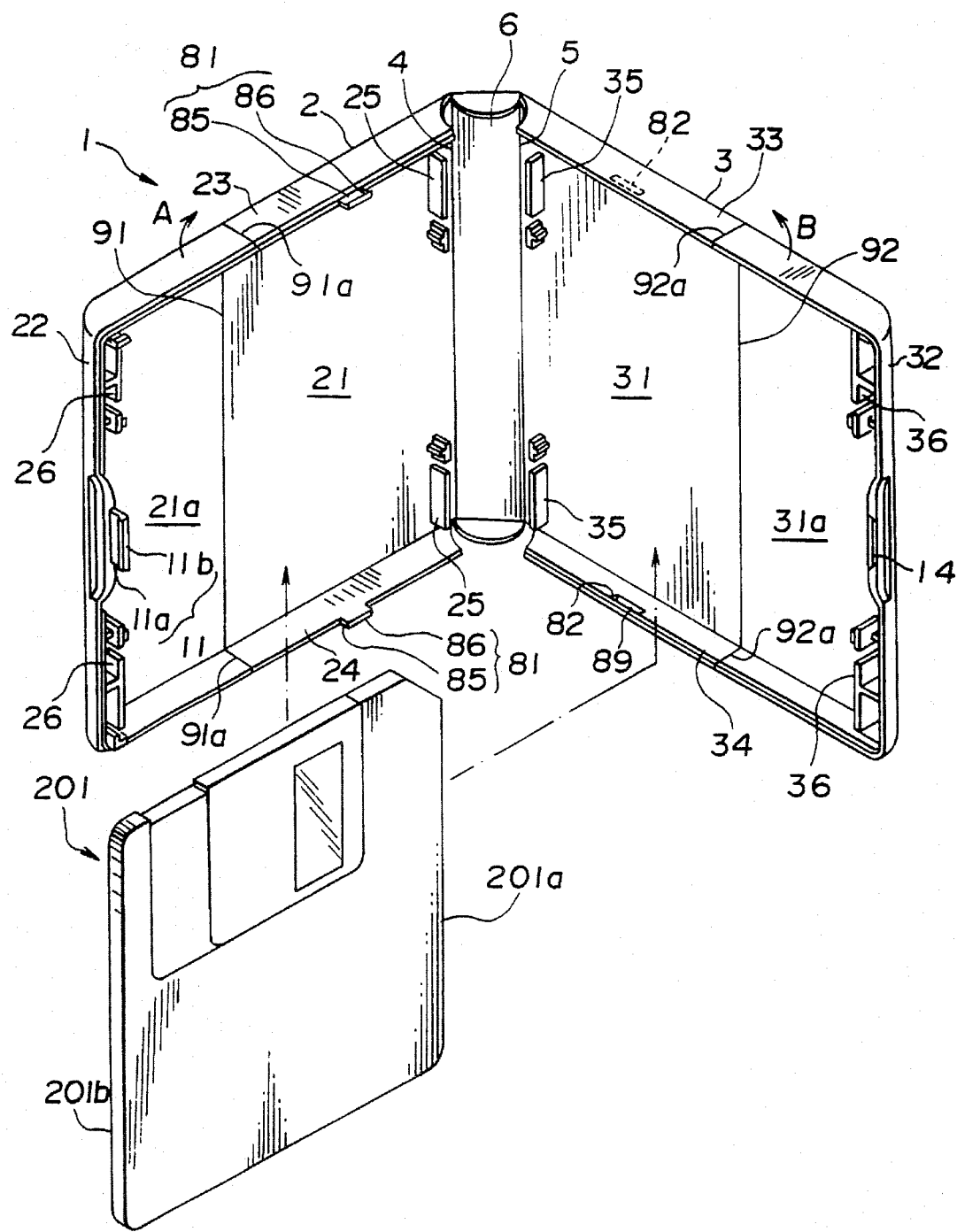
FIG. 18 is a perspective view of a storage case for floppy disks according to a third preferred embodiment of the invention.
Figure 19:
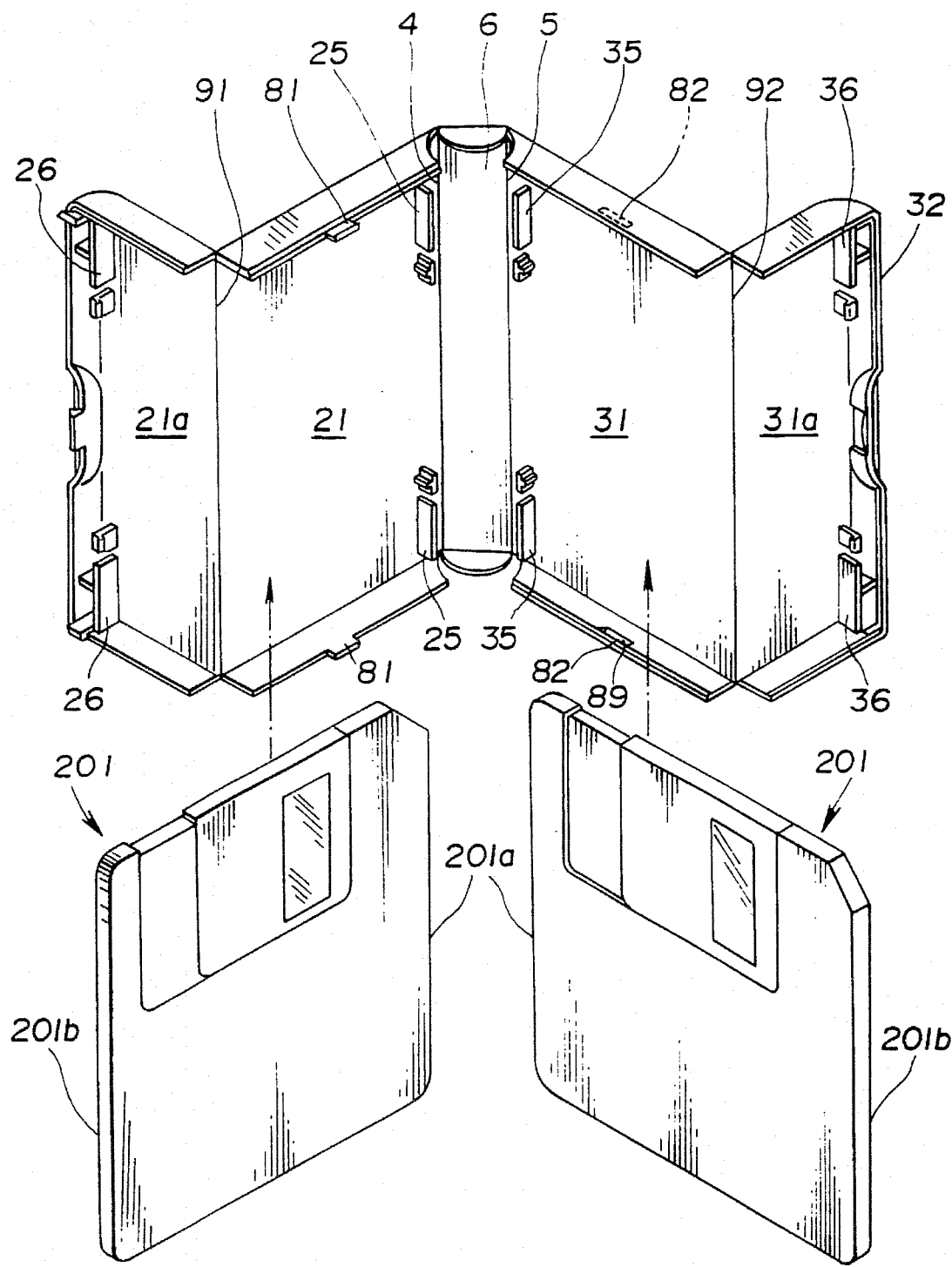
FIG. 19 is a perspective view of the storage case of the third embodiment in a condition where third and fourth hinges thereof are opened.

According to the above described construction, the steps for making a storage case 1 according to the present embodiment are described hereinbelow with reference to FIG. 17. It will be noted that the storage case 1 is integrally formed of synthetic resin using a die or mold 71 as shown in FIG. 17.

A gate 73 is provided in the die 71 for injecting the synthetic resin through a cavity 72 corresponding to a desired shape of the storage case 1. The gate is provide at a central portion of the rear (outer) side of a portion of the mold forming the spine 6 of the storage case 1, a front (inner) side of this portion of the mold is further provided with rib forming sections for molding the ribs 47, 47, 48, 48 to be provided on the spine. The rest of the mold is shaped so as to form the other features of the storage case 1 as described hereinabove.

Since, four positioning ribs 47, 47, 48, 48 are provided on the spine 6 according to the second embodiment, instead of the two continuous holding ribs of the first embodiment, injection is simplified and defects may be reduced, since a central portion of the spine 6 is open, allowing synthetic resin to flow freely into the mold thus assuring complete formation of all components of the storage case, including the positioning ribs 47, 47, 48, 48, the end members 49, 50, the pinching ribs 51, 52, and the recess 62, whereas, if elongate holding ribs such as provided in the first embodiment are utilized, free flow of the synthetic resin in the spine portion of the mold may be inhibited. Thus, according to the second embodiment a storage case 1 with all the advantages of that of the first embodiment may be provided with improved ease of manufacture.

Also, the rounded outer side of the hinges prevent the storage case from catching on objects which may contact the storage case 1 and an overall durability is improved. Further, since the finger applying portions of the first closing member 11/first engaging member 14 are rounded and provided with a thicker wall portion, deformation of the case and build-up of dust etc., is suitably prevented.

Hereinbelow, a third embodiment of a storage case 1 for flay uniformly shaped objects will be described with reference to FIGS. 18–22.

According to the third embodiment, instead of the second and third closing members 12, 13 and engaging portions 15, 16, side latching portions 81 are included which comprise extending portions 85 and lip portions 86 oppositely facing outwardly with respect to each other so as to engage side engaging portions 82 having projecting portions 89 formed thereon in a closed condition of the storage case.

Reinforcing opposed ribs 25, 26 and 35, 36 are vertically projected from the base 2 and lid 3 respectively so as to reinforce a rigidity of the storage case 1 in a closed condition, particularly in the vicinity of the hinges 4 and 5 and corner portions of the openable side of the storage case on either side of the front wall portions 22, 32 to further prevent plastic deformation of the case when being carried. Thus the security of closure according to the present embodiment is enhanced. The opposed ribs 25, 26, 35, 36 also act to squeeze a floppy disk 201 (FD) inserted into the top and/or bottom plate 21, 31 of the base 2 or lid 3.

Figure 20:
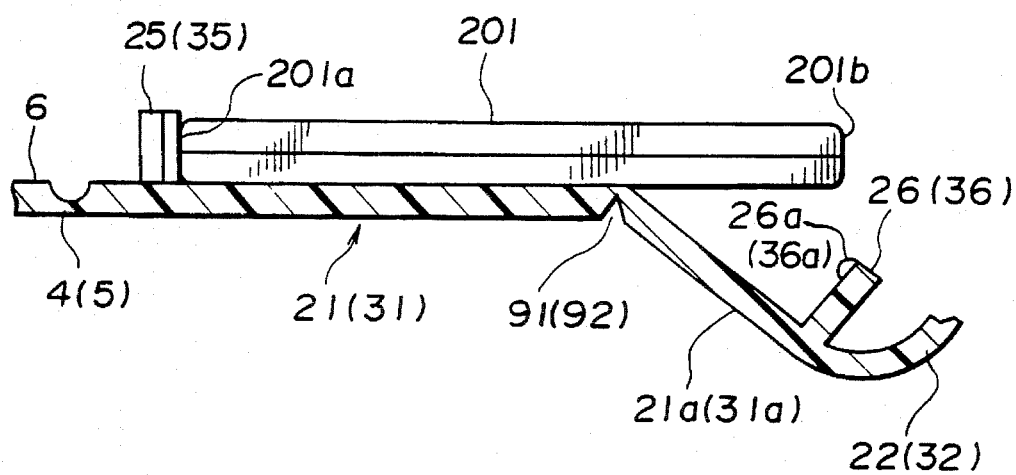
FIG. 20 is a cross-sectional view of a base portion of the storage case of the third embodiment when a floppy disk is positioned therein in an open condition of the third hinge.
Figure 21:
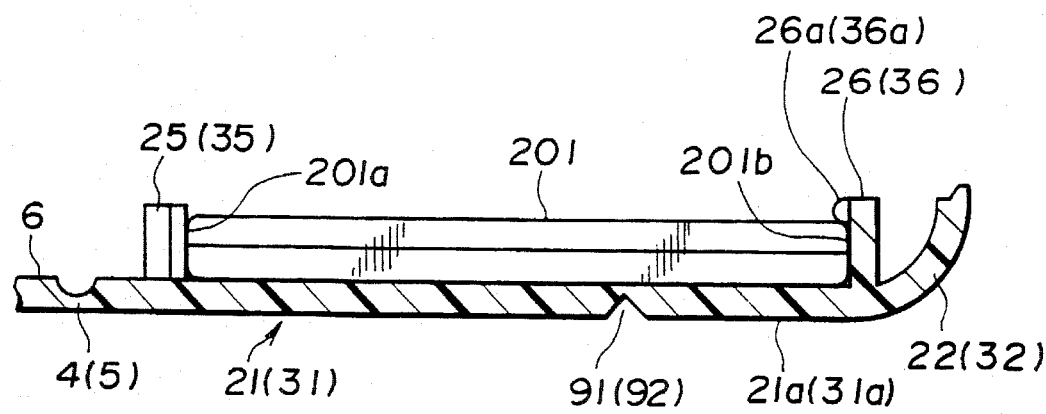
FIG. 21 is a cross-sectional view of a base portion of the storage case of the third embodiment when a floppy disk is held therein in a closed condition of the third hinge.
Figure 22:
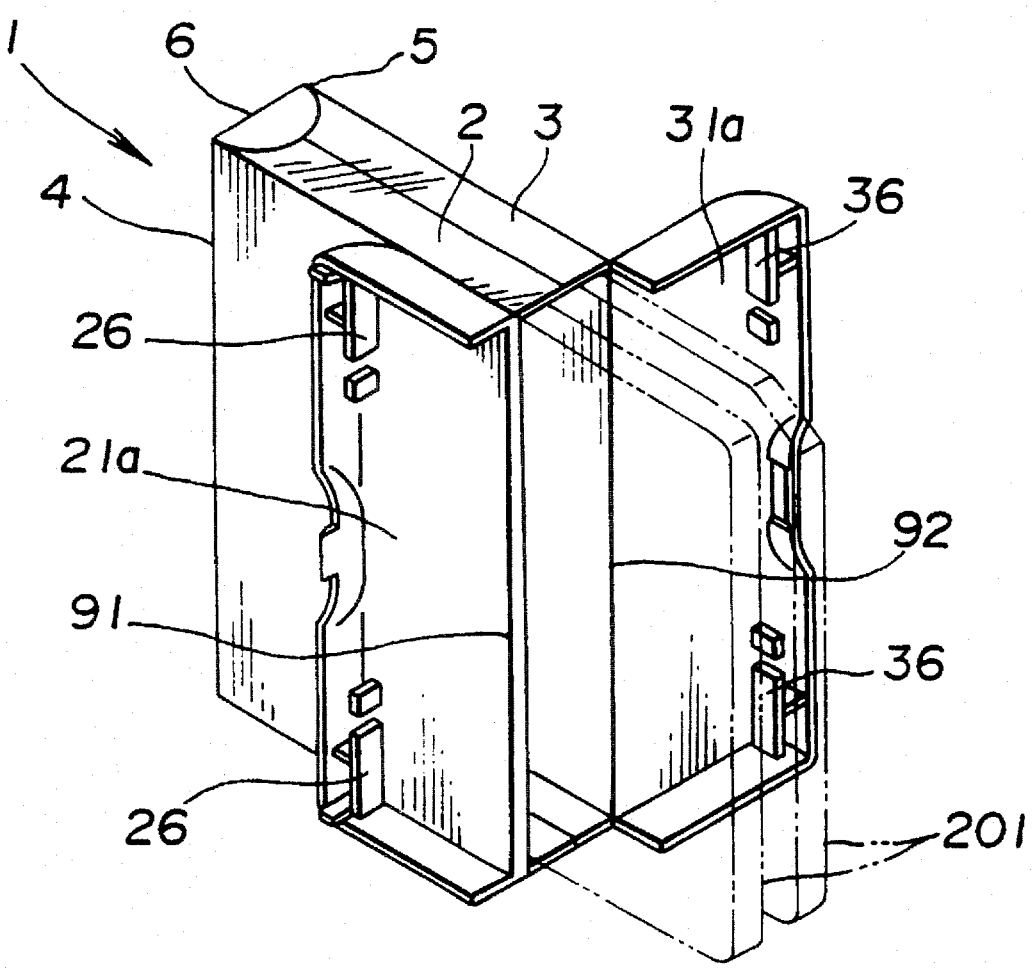
FIG. 22 is a perspective view of the storage case of the third embodiment in a closed condition of first and second hinges thereof, while the third and fourth hinges thereof are opened.
Figure 23:
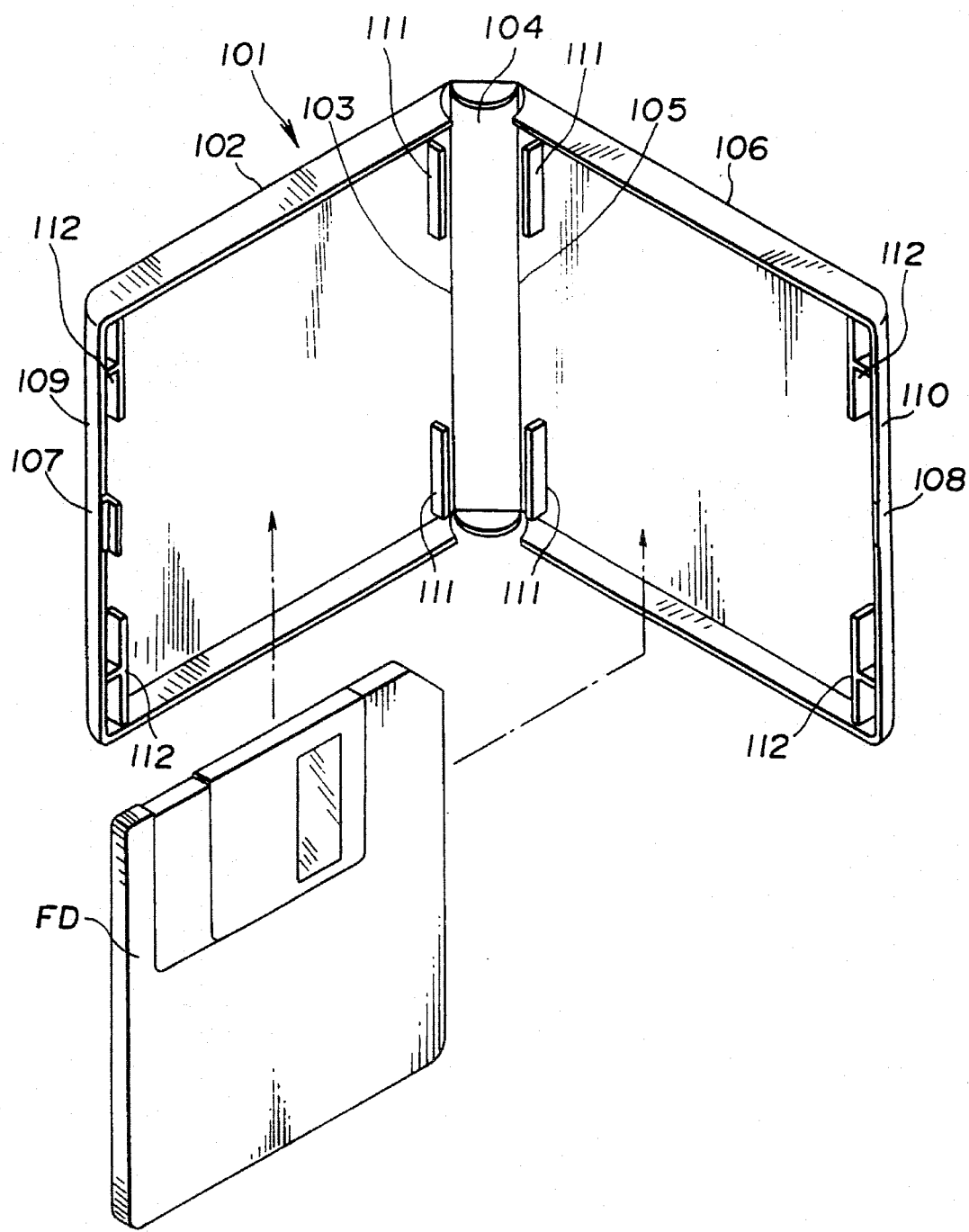
FIG. 23 is a perspective view of a conventional storage case for floppy disks.

Also, according to the above described third embodiment, as seen in FIG. 19–22, a modification is possible whereby third and fourth hinges 91, 92 are provided in a central part of each of the base 2 and the lid 3. Thus, the top and bottom plates 21 and 31 are divided into top plate 31 and top end plate 31a and bottom plate 21 and bottom end plate 21a. According to this, as best seen in FIGS. 20 and 21, the hinge 91 (92) is formed to open the top and bottom end plates 31a and 21a in a direction opposite from that of the first and second hinges 4, 5 such that the storage case may be partially opened for conveniently removing a floppy disk 201 (FD) from either of the base 2 or the lid 3 while the storage case 1 remains substantially closed, as seen in FIG. 22. According to this, vertical cuts 91a, 91a, 92a, 92a (see FIG. 18) are formed in the side walls 23, 24, 33, 34 corresponding to the positions of the hinges 91, 92 and surfaces 201a and 201b of the floppy disk 201 are held between the sides of the ribs 25, 26 (35, 36) and the rib 26 (36) may be provided with a top pressing lip portion 26a (36a) similarly to the rib 26 of the first embodiment for applying further retaining pressure on the floppy disk 201.

According to this modification, since the second and third closing members and corresponding second and third engaging portions are provided between the spine 6 and the third and fourth hinges 91, 92, corresponding to the top and bottom plates 21, and 31 the storage case stays firmly shut even when one or both of the third and fourth hinges is moved to an open condition as shown in FIGS. 20 and 22.

In other respects, the storage case of the third embodiment may have the same, or any combination of the features of the above described first and second embodiments and the identical advantages thereof may be enjoyed.

For example, although the present embodiment does not utilize holding and/or positioning ribs on the spine 6 for retaining a third floppy disk FD, it will be understood that such structure may be incorporated in the present embodiment such that the storage case 1 of the third embodiment may be made for storing either two, or three floppy disks FD as desired. It will further be understood that the storage cases 1 of the previously described first and second embodiment may be manufactured without the rib structure on the spine 6 for providing a storage case 1 effective for storage of two, rather than three, floppy disks FD, or other flat, uniformly shaped, objects.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A storage case for storing flat, uniformly shaped quadrilateral objects, comprising:

a substantially rectangular spine;

a quadrilateral base having a first plate, a first side of said first plate being attached to a first longitudinal side of said spine via a first hinge, a front wall of said base projected in a first direction from a second side of said first plate which is remote from said hinge, and side walls of said base projected in said first direction from third and fourth sides of said first plate, said first direction being substantially perpendicular to a plane containing said first plate;

a quadrilateral lid having a second plate, a first side of said second plate being attached to a second longitudinal side of said spine via a second hinge, a front wall of said lid projected in a second direction from a second side of said second plate which is remote from said second hinge, and side walls of said lid projected in said second direction from third and fourth sides of said second plate, said second direction being substantially perpendicular to a plane containing said second plate, said base and said lid being pivotable relative to said spine on said first and second hinges to form a substantially enclosed box;

a first closing member having a wall portion projecting from a central portion of said front wall of one of said base or said lid, said first closing member comprising a lip projected from a free end of said wall portion in a direction facing away from said spine;

a first engaging portion engageable with said first closing member provided in a central portion of the front wall of the other of said base or said lid, said first engaging portion comprising a projecting portion formed on an inner side of said front wall of the other of said base or said lid, said projecting portion being engageable under said lip of said first closing member;

second and third closing members provided respectively on each of said side walls of a first one of said base or said lid;

second and third engaging portions engageable with said second and third closing members and respectively provided at a corresponding position along a side wall of a second one of said base or said lid; and two pair of opposed ribs provided on an inner surface of each of said base and said lid, each pair of opposed ribs providing means for snugly receiving a flat, uniformly shaped quadrilateral object for applying pinching pressure to the object.

2. A storage case as set forth in claim 1, wherein said first, second and third closing members are provided on said base and said first, second and third engaging members are provided on said lid, said second and third closing members being respectively located at opposing corners of said base where said front wall of said base meets said side walls of said base, and said second and third engaging portions being respectively located at opposing corners of said lid where said front wall of said lid meets said side walls of said lid.

3. A storage case as set forth in claim 1, wherein a first rib of each pair of opposed ribs includes a pressure applying projection projected in the direction of a second rib opposed to said first rib, and said second rib includes a lip projected from an upper side of the second rib in the direction of said first rib so as to apply pressure to a top side of one of said flat, uniformly shaped quadrilateral objects inserted between said first and second ribs.

4. A storage case as set forth in claim 1, wherein said spine further includes a pair of longitudinally arranged holding bars spaced along said spine substantially in parallel for permitting insertion of a flat, uniformly shaped quadrilateral object between said holding bars while applying squeezing pressure to the object.

5. A storage case as set forth in claim 4, wherein end portions are provided at each end of said spine, said holding bars being extended between said end portions, said end portions forming part of the corresponding sides of said storage case in a closed condition of said storage case.

6. A storage case as set for the in claim 5, wherein said end portions are semicircular and are snugly accommodated by corresponding cut-outs in proximate ends of each of said side walls.

7. A storage case as set forth in claim 1, wherein at least one of said first closing member and said first engaging portion includes a finger applying recess, said finger applying recess having corner areas which are rounded.

8. A storage case as set forth in claim 8, wherein a thickness of a wall portion of said finger applying recess is larger than a thickness of said front walls of said base and said lid.

9. A storage case as set forth in claim 1, wherein said storage case is integrally formed of synthetic resin.

10. A storage case as set forth in claim 9, wherein said first and second hinges are of a thin wall type.

11. A storage case as set forth in claim 10, wherein said first sides of said lid and said base and said longitudinal sides of said spine bordering said thin wall type hinge are tapered at an angle determined such that said base and said lid are held perpendicular to said spine in a closed condition of said storage case.

12. A storage case as set forth in claim 10, wherein a width of a thin wall portion of said hinges is established according to the relation $I=2R\pi/4$, wherein $I=$a width of a thin wall portion of said hinge; and $R=$a desired radius on an outer surface of said hinge in a closed condition of said storage case.

13. A storage case as set forth in claim 1, wherein an upper surface of said side walls of said lid are formed at an angle inverse to an angle at which upper sides of said side walls of said base are formed, such that said upper sides of said side walls of said lid and said base are flushly mateable in a closed condition of said storage case.

14. A storage case as set forth in claim 1, wherein said second and third closing members respectively comprise a projecting wall portion having a lip member projected outwardly from a respective side wall, and said second and third engaging portions respectively comprise a projecting portion formed on an inner side of a respective side wall and engageable under the lip member of said second or third closing member.

15. A storage case as set forth in claim 1, wherein said second and third closing members and said second and third engaging portions each comprises a lip portion projected from one side, said lip portions of said closing members facing in opposite directions from corresponding lip portions of said engaging portions so as to mutually engage each other in a closed condition of the storage case.

16. A storage case for storing flat, uniformly shaped quadrilateral objects, comprising:

a substantially rectangular spine;

a quadrilateral base having a first plate, a first side of said first plate being attached to a first longitudinal side of said spine via a first hinge, a front wall of said base projected in a first direction from a second side of said first plate which is remote from said hinge, and side walls of said base projected in said first direction from third and fourth sides of said first plate, said first direction being substantially perpendicular to a plane containing said first plate;

a quadrilateral lid having a second plate, a first side of said second plate being attached to a second longitudinal side of said spine via a second hinge, a front wall of said lid projected in a second direction from a second side of said second plate which is remote from said second hinge, and side walls of said lid projected in said second direction from third and fourth sides of said second plate, said second direction being substantially perpendicular to a plane containing said second plate, said base and said lid being pivotable relative to said spine on said first and second hinges to form a substantially enclosed box;

a first closing member having a wall portion projecting from a central portion of said front wall of one of said base or said lid, said first closing member comprising a lip projected from a free end of said wall portion in a direction facing away from said spine;

a first engaging portion engageable with said first closing member provided in a central portion of the front wall of the other of said base or said lid, said first engaging portion comprising a projecting portion formed on an inner side of said front wall of the other of said base or said lid, said projecting portion being engageable under said lip of said first closing member;

second and third closing members provided respectively on each of said side walls of a first one of said base or said lid;

second and third engaging portions engageable with said second and third closing members and respectively provided at a corresponding position along a side wall of a second one of said base or said lid; and two pair of opposed ribs provided on an inner surface of each of said base and said lid, each pair of opposed ribs providing means for snugly receiving a flat, uniformly shaped quadrilateral object for applying pinching pressure to the object;

wherein said spine futher includes a pair of longitudinally arranged holding bars spaced along said spine substantially in parallel for permitting insertion of a flat, uniformly shaped quadrilateral object between said holding bars while applying squeezing pressure to the object;

wherein end portions are provided at each end of said spine, said holding bars being extended between said end portions, said end portions forming part of the corresponding sides of said storage case in a closed condition of said storage case; and wherein squeezing ribs are provided at facing sides of each of said end portions, said squeezing ribs being arranged at a substantially center area of each of said end portions between said holding bars so as to apply squeezing pressure to upper and lower sides of one of said flat, uniformly shaped quadrilateral objects inserted between said holding bars.

17. A storage case as set forth in claim 6, wherein facing ends of said squeezing ribs are inverse tapered.

18. A storage case as set forth in claim 6, wherein facing ends of said squeezing ribs are formed in a semicircular configuration.

* * * * *